United States Patent
Fan et al.

(10) Patent No.: US 10,671,901 B1
(45) Date of Patent: Jun. 2, 2020

(54) LAYERED BARCODES READABLE FROM MULTIPLE ANGLES IN THREE DIMENSIONS

(71) Applicant: INTERNATIONAL BUSINESS MACHINES CORPORATION, Armonk, NY (US)

(72) Inventors: Hua Wei Fan, Beijing (CN); Xin Zhao, Beijing (CN); Lei Wang, Beijing (CN); Zheng Lei An, Beijing (CN); Ting Yin, Beijing (CN); Hong Wei Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/191,762

(22) Filed: Nov. 15, 2018

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01); *G06K 7/1426* (2013.01); *G06K 19/06131* (2013.01)

(58) Field of Classification Search
CPC ........... G06K 19/06037; G06K 7/1426; G06K 7/1417; G06K 19/06131
See application file for complete search history.

(56) References Cited

U.S. PATENT DOCUMENTS

| 8,121,717 | B2 | 2/2012 | Idaka | |
| 8,668,137 | B2 | 3/2014 | Herzig | |
| 9,111,186 | B2* | 8/2015 | Blasinski | G06K 19/0614 |
| 9,659,202 | B2* | 5/2017 | Kamijo | G06K 7/1417 |
| 2015/0363683 | A1 | 12/2015 | Polzoni | |
| 2015/0379314 | A1 | 12/2015 | Schreiber | |
| 2017/0344776 | A1* | 11/2017 | Sharma | G06K 19/06112 |

FOREIGN PATENT DOCUMENTS

| CN | 101739720 A | 6/2010 |
| CN | 104657768 B | 11/2017 |

OTHER PUBLICATIONS

Carly Nesson, "Encoding Multi-layered Data into QR codes for Increased Capacity and Security", 2013.*
Denso ADC, "QR Code Essentials", URL: http://www.nacs.org/LinkClick.aspx?fileticket=D1FpVAvvJuo%3D&tabid=1426&mid=4802. Year: 2011. Retrieved May 11, 2018.
G.J. Laurer et al., "Bar Code Scanner with 360 Scan Field", ip.com, IPCOM000068099D. Nov. 1, 1979. 3 pages.

* cited by examiner

*Primary Examiner* — Seung H Lee
(74) *Attorney, Agent, or Firm* — Cantor Colburn LLP; Teddi Maranzano (57) ABSTRACT

A computer-implemented method includes determining a set of parameters defining an arrangement of a plurality of copies of a standard barcode in two or more of layers of a layered barcode encoding subject data. The layered barcode has a plurality of cells, and for each cell in the layered barcode, a combined value for the cell is determined, where the combined value of the cell indicates a respective value of each layer at the cell, and the combined value is mapped to a color corresponding to the combined value. The plurality of layers of the layered barcode are generated, such that, at each cell of the plurality of cells, the layered barcode includes the color corresponding to the combined value of the cell.

17 Claims, 6 Drawing Sheets

LAYERED BARCODES READABLE FROM MULTIPLE ANGLES IN THREE DIMENSIONS

BACKGROUND

The present invention relates to barcodes and, more specifically, to layered barcodes readable from multiple angles in three dimensions.

Barcodes have become popular to convey information in various circumstances. Quick Response (QR) codes are a versatile type of two-dimensional barcode that can be used to encode web addresses, resource locations, or other data. Typically, a QR code includes square cells arranged in a square grid on a white background. The arrangement of cells can be interpreted as a binary representation of encoded data. A scanner captures the QR code with a camera and then decodes the data to discover the encoded data.

Compared to traditional one-dimensional barcodes, QR codes are able to encode a greater amount of information and can typically be read faster. Various applications exist for smartphones and other devices to enable these devices to read QR codes and other barcodes, so as to quickly convey information to users of such devices. As a result, businesses are using QR codes with the expectation that users will be able to scan them and extract the information those businesses want customers to have. For instance, QR codes are often used in promotional materials to provide links to a business's website or to product purchase pages. For another example, QR codes are used to provide coupons within brick-and-mortar stores or elsewhere.

SUMMARY

Embodiments of the present invention are directed to a computer-implemented method for generating a layered barcode. A non-limiting example of the computer-implemented method includes determining a set of parameters defining an arrangement of a plurality of copies of a standard barcode in two or more of layers of a layered barcode encoding subject data. The layered barcode has a plurality of cells, and for each cell in the layered barcode, a combined value for the cell is determined, where the combined value of the cell indicates a respective value of each layer at the cell, and the combined value is mapped to a color corresponding to the combined value. The plurality of layers of the layered barcode are generated, such that, at each cell of the plurality of cells, the layered barcode includes the color corresponding to the combined value of the cell.

Embodiments of the present invention are directed to a system for generating a layered barcode. A non-limiting example of the system includes a memory having computer-readable instructions and one or more processors for executing the computer-readable instructions. The computer-readable instructions include instructions for determining a set of parameters defining an arrangement of a plurality of copies of a standard barcode in two or more of layers of a layered barcode encoding subject data. The layered barcode has a plurality of cells, and for each cell in the layered barcode, a combined value for the cell is determined, where the combined value of the cell indicates a respective value of each layer at the cell, and the combined value is mapped to a color corresponding to the combined value. Further according to the computer-readable instructions, the plurality of layers of the layered barcode are generated, such that, at each cell of the plurality of cells, the layered barcode includes the color corresponding to the combined value of the cell.

Embodiments of the invention are directed to a computer-program product for generating a layered barcode, the computer-program product including a computer-readable storage medium having program instructions embodied therewith. The program instructions are executable by a processor to cause the processor to perform a method. A non-limiting example of the method includes determining a set of parameters defining an arrangement of a plurality of copies of a standard barcode in two or more of layers of a layered barcode encoding subject data. The layered barcode has a plurality of cells, and for each cell in the layered barcode, a combined value for the cell is determined, where the combined value of the cell indicates a respective value of each layer at the cell, and the combined value is mapped to a color corresponding to the combined value. Further according to the method performed by the processor, the plurality of layers of the layered barcode are generated, such that, at each cell of the plurality of cells, the layered barcode includes the color corresponding to the combined value of the cell.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, while QR codes and other barcodes are have proved useful for various purposes, they are still limited in some respects. For instance, if a single QR code is displayed in public, then typically only a single person can scan that barcode at a time. For instance, in a store setting, a QR code may be displayed near a product or upon entry into the store, to provide one or more coupons to shoppers who scan that QR code. However, QR codes are two-dimensional and thus cannot be scanned from extreme angles or if only a portion of the QR code is reachable. Thus, in a setting where multiple people wish to scan a QR code, some people will have to wait until the QR code becomes available. While in some cases this can be addressed by using very large QR code, this may occupy too much space, which can become costly if a business is using paid advertising space for the placement of the QR code.

Turning now to an overview of the aspects of the invention, one or more embodiments of the invention address the above-described shortcomings of the prior art by providing a layered barcode, such as a QR code, provided in three dimensions. A layered barcode may be positioned on a three-dimensional (3D) object for capture from various angles. Given a standard QR code and a 3D object, such as a cylinder, embodiments of the invention determine how to arrange two or more overlapping layers of copies of the QR code around the 3D object. Across the various layers, the copies of the QR code may be shifted by a determined offset. In some embodiments of the invention, each layer includes one or more copies of the QR code. Based on the data and position of the QR code within a layer, it may be determined whether the layer is set or not (i.e., TRUE or FALSE) for each cell in the layered barcode. When combined, the settings of the various layers form a value at each cell in the layered barcode, and each possible value may be assigned a respective color representing that value. Thus, when scanned by a scanner, the scanner can identify the values of the various layers at each cell, based on the resulting color of the cell, and may thus identify and read a complete QR code within the various layers.

The above-described aspects of the invention address the shortcomings of the prior art by providing a layered barcode on a 3D object, where each layer contributes to the resulting color of each cell in the layered barcode. As a result, a scanner can capture an image of a portion of the layered barcode and can identify, within the image, a complete layer to be decoded. As a result, the layered barcode can be read and used more efficiently, especially in crowds.

Figure 1:
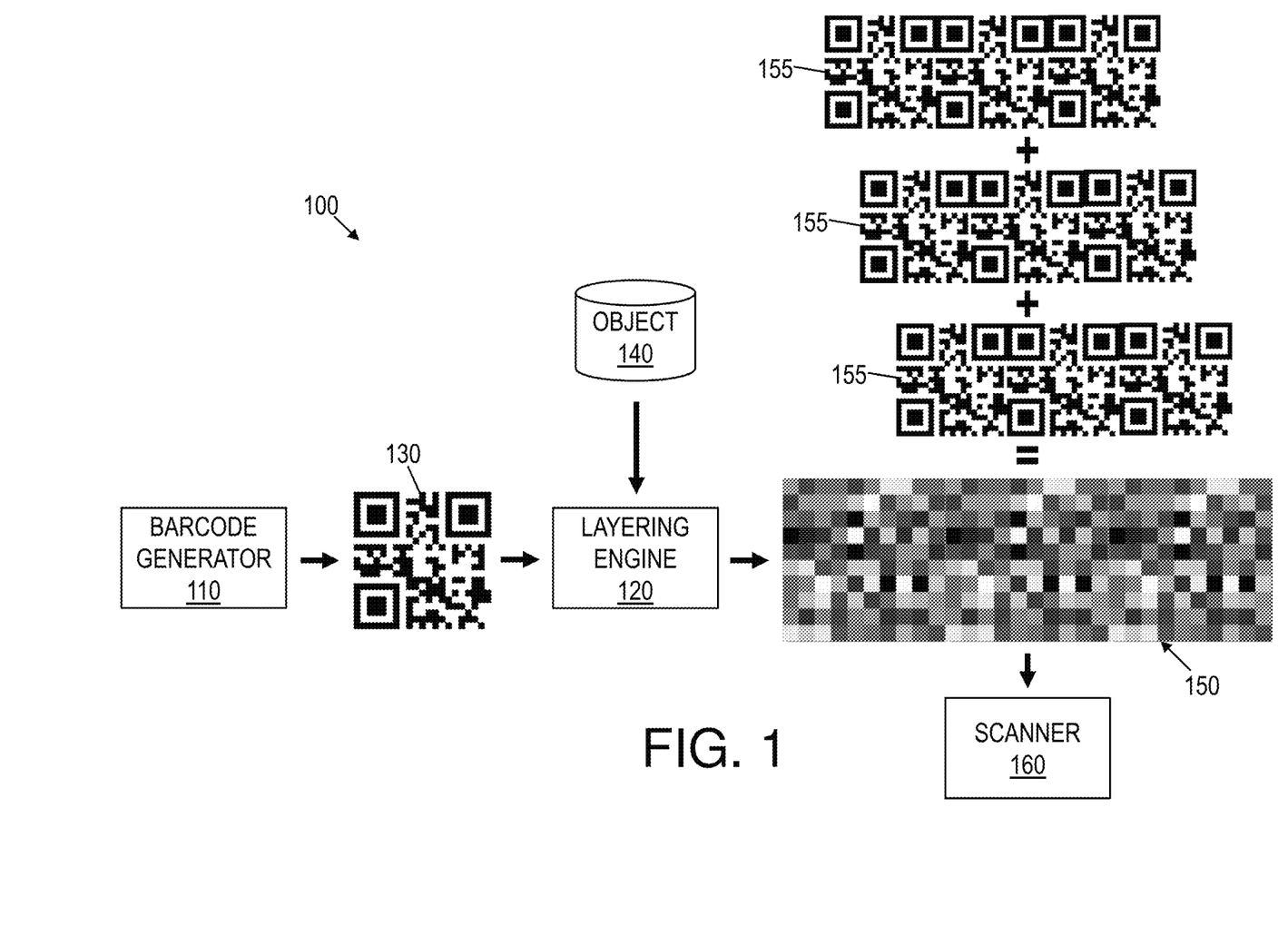
FIG. 1 is a diagram of a barcode-generation system for generating layered barcodes, according to some embodiments of the invention.

Turning now to a more detailed description of aspects of the present invention, FIG. 1 is a diagram of a barcode-generation system 100 according to some embodiments of the invention. As shown in FIG. 1, the barcode-generation system 100 may include a barcode generator 110 and a layering engine 120. Generally, the barcode generator 110 may generate a standard barcode 130, such as a QR code, for input into the layering engine 120. The layering engine 120 may also take as input a description of an object 140, which may be 3D, on which a resulting layered barcode 150 is to be positioned in 3D space, thereby making the layered barcode 150 three-dimensional. After its generation, the layered barcode 150 may be printed onto the object 140 or may be printed onto some other material and placed onto the object 140. When a scanner 160 captures an image of at least a portion of the layered barcode 150, the scanner 160 can isolate a standard barcode 130 of the layered barcode 150 to determine what data is encoded in the layered barcode 150.

In some embodiments of the invention, a layered barcode 150 includes two or more layers 155, where each possible combination of the layers 155 is coded to a distinct color or pattern, as will be described below. Each layer 155 may itself include an encoded version of one or more standard barcodes 130, which may be arranged in a series. The various layers 155 may overlap one another but may be shifted such that the series of standard barcodes 130 take various positions across the layers 155. In some embodiments of the invention, each layer 155 includes a standard barcode 130 that is common to all the layers 155. Generally, a standard barcode 130 includes a matrix of cells, in which some are black or some other foreground color and other cells are transparent, white, or some other background color. The cells in the foreground color are considered to be set (i.e., on or TRUE), while the cells in the background are considered unset (i.e., off or FALSE). Thus, because a layer 155 includes a series of standard barcodes 130, at each cell within a layer 155, the value of the layer 155 is on or off based on whether the standard barcode 130 is on or off in that cell.

When each layer 155 is assigned to a dimension within a vector, then the set of layers 155 results in a value of that vector each cell of the layered barcode 150. When the layered barcode 150 is applied to a 3D object 140, the various layers 155 positioned differently from one another may be angled differently from one another and may thus be readable at various angles. Thus, a scanner 160 in one position relative to the object 140 may have a full view of one encoded standard barcode 130 in one layer 155 but not another encoded standard barcode 130 in another layer 155, which may be in full view of a scanner 160 in another position.

Although the layered barcodes 150 described herein are largely layered QR codes, it will be understood by one skilled in the art that a layered barcode 150 may instead be, for example, a linear barcode in a layered format as described herein. A layered QR code may benefits over a linear barcode due to the versatility of the QR code. Further, although the objects 140 described herein are largely cylinders, it will be understood by one skilled in the art that other 3D objects 140 are also usable for placement of a layered barcode 150.

Figure 2A:
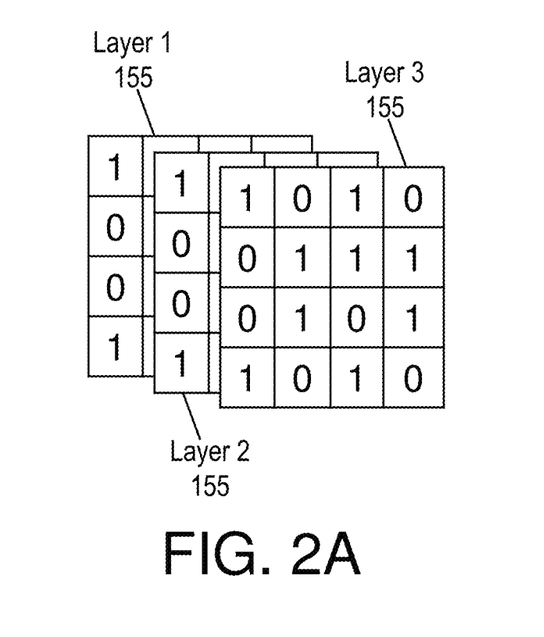
FIGS. 2A-2B illustrate layers of a layered barcode, according to some embodiments of the invention.
Figure 2B:
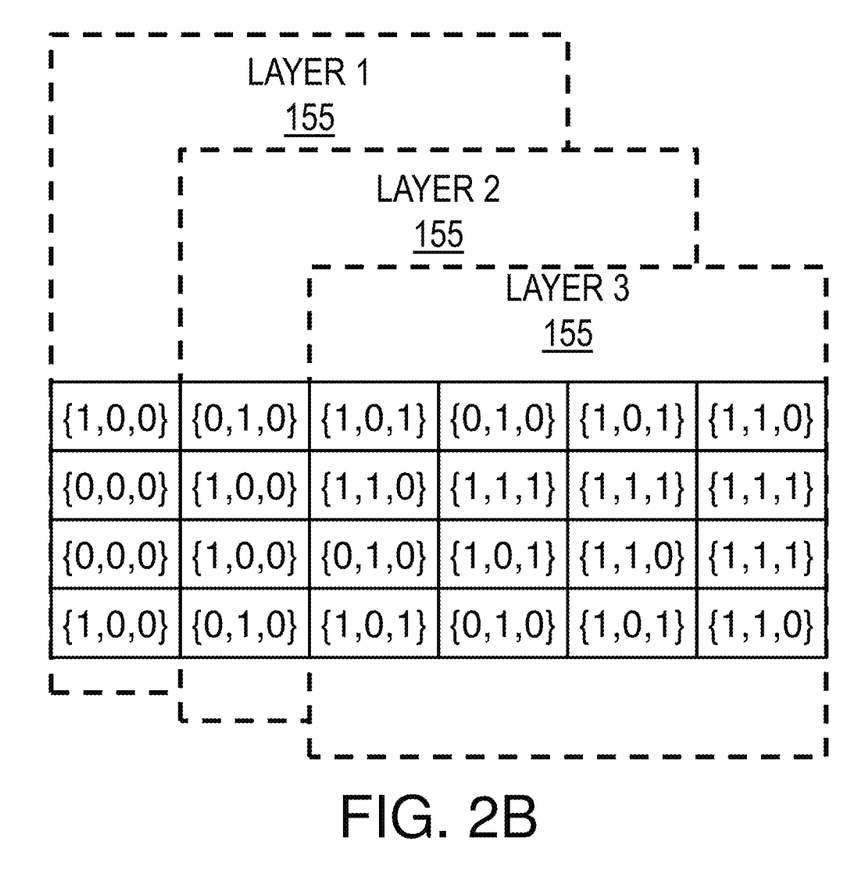

FIGS. 2A-2B conceptually illustrate the layers 155 of an example layered barcode 150, according to some embodiments of the invention. Although FIGS. 2A-2B illustrate three layers 155 for the sake of simplicity, it will be understood by one skilled in the art that a layered barcode 150 may have fewer layers 155 or a greater number of layers 155. Further, although each layer 155 of the layered barcode 150 in this example has only sixteen cells in a four-by-four arrangement, it will be understood that many more cells may be included in each layer 155.

Each layer of the layered barcode 150 may encode a plurality of bits, or cells, each of which may have a value of 0 or 1, corresponding respectively to being unset or set, or being off or on. As shown in the example of FIG. 2A, each layer 155 may encode the same data. More specifically, the data encoded may be a series of copies of a standard barcode 130, where each layer 155 includes this data shifted according to the offset of the layer. In some embodiments of the invention, each layer 155 is the same size as the other layers 155.

FIG. 2B illustrates another conceptual view of the example layers 155 of FIG. 2A. The layered barcode 150 may be printed on a plane, which may be transformed to fit the object 140 being used, and thus, the layers 155 themselves overlap within a single plane according to some embodiments of the invention. FIG. 2B illustrates how the values in each layer 155 may overlap within common cells, given the offset between layers 155. Each layer 155 includes a matrix of cells representing values of the standard barcode 130 being represented, and because the layers 155 overlap, so do these cells. More specifically, in each cell of FIG. 2B, a vector includes three dimensions, or bits, with each dimension corresponding to one of the three layers 155. The vector within each cell shows the value of the various layers within the cell, where a value of 1 in a cell for a first layer 155 (i.e., in a first position of the vector) indicates the corresponding cell of the first layer 155 is set (i.e., a copy of the standard barcode 130 in the first layer 155 is set at that cell). For instance, given the cell in the top row and third from the left, this cell has a value of 1 for the first layer 155, 0 for the second layer 155, and 1 for the third layer 155, resulting in the vector {1, 0, 1}.

In some embodiments of the invention, each combination of values in the various layers may be assigned a color. For instance, in this example, in which the vector has three dimensions, there are a possibility of $2^3=8$ vectors. Thus, eight colors may be assigned, with one color assigned to each possible vector. As a result, the appearance of a particular color in a cell of the layered barcode 110 indicates that the vector to which that particular color is assigned describes the setting of the layers in that cell. For instance, if the vector {1, 0, 1} is assigned the color red, then the cell in the top row and third from the left, which is associated with this vector, may be colored red based on the vector value. For each cell in the layered barcode 150, the barcode-generation system 100 may determine whether the bit (i.e., dimension of the vector) corresponding to that position is set for each layer 155, and may apply the color assigned to the resulting vector. To generate the layered barcode 150, this evaluation may be performed for each cell in the layered barcode 150 (i.e., at each cell of the object 140 desired to be covered by the layered barcode 150).

Figure 3A:
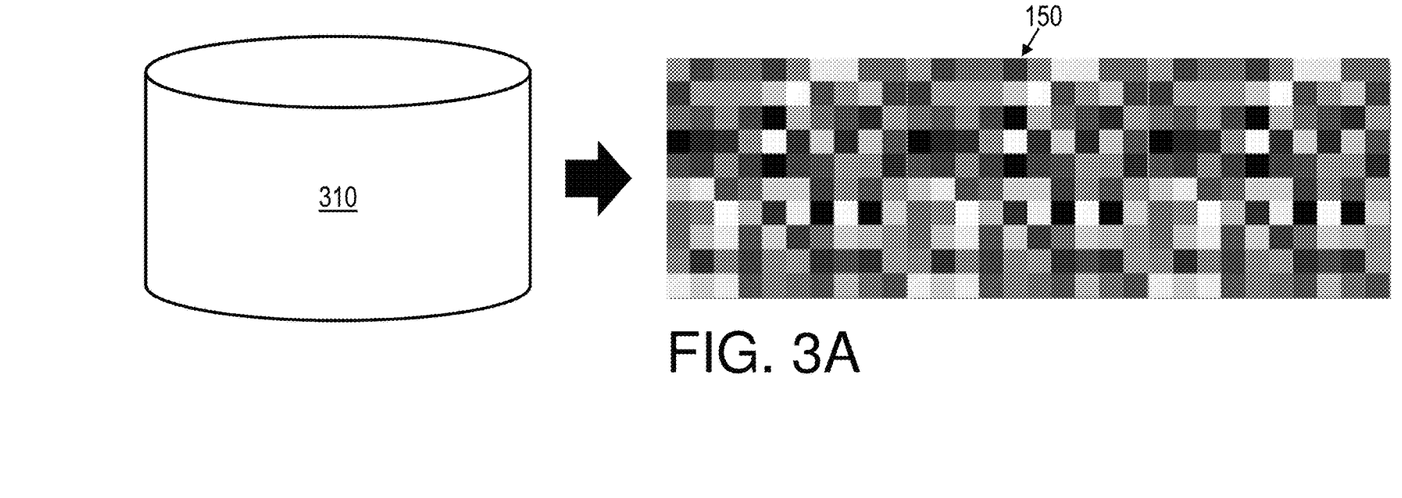
FIG. 3A is an example layered barcode applicable to an example three-dimensional object, according to some embodiments of the invention.

FIG. 3A is an example layered barcode 150, specifically a layered QR code, applicable to an example 3D object 140, according to some embodiments of the invention. In this example, the object 140 is a right cylinder 310, as shown in FIG. 2. As shown in FIG. 2, the side of the cylinder 310 can be flattened into a rectangle, as shown, and thus by generating a layered barcode 150 to fit within such a rectangle, this layered barcode 150 can be wrapped around the cylinder 310, such as by being printed on the cylinder 310 itself or being affixed around the cylinder 310.

Figure 3B:
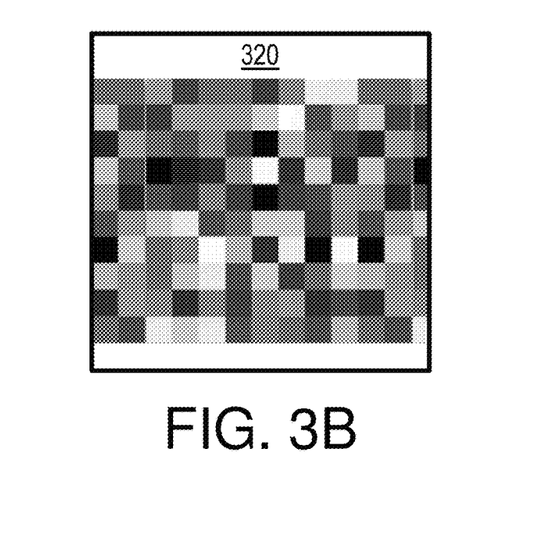
FIG. 3B illustrates an example image of the layered barcode of FIG. 3A as captured by a scanner, according to some embodiments of the invention.

FIG. 3B illustrates an example image 320 of the layered barcode 150 as captured by a scanner 160, according to some embodiments of the invention. In this example, the captured image 320 includes two complete standard barcodes 130 encoded as colors in the layered barcode 150. A scanner 160 configured to read a layered barcode 150 may include a mapping from colors to vectors. Thus, given this mapping, the scanner 160 may be able to isolate each of the layers 155 of the captured image 320, which is at least a portion of the layered barcode 150. Each standard barcode 130 may include position markers, which are known in the art to mark the boundaries of QR codes. Based on the detection of position markers in each layer 155 within the captured image 320, the scanner 160 may determine which standard barcodes 130 encoded in the isolated layers 155 of the layered barcode 150 are complete standard barcodes 130. Upon identifying a complete standard barcode 130 within a layer 155, the scanner 160 may interpret that standard barcode 130 to determine the subject data encoded in that standard barcode 130, which is also the subject data encoded in the layered barcode 150.

Figure 4:
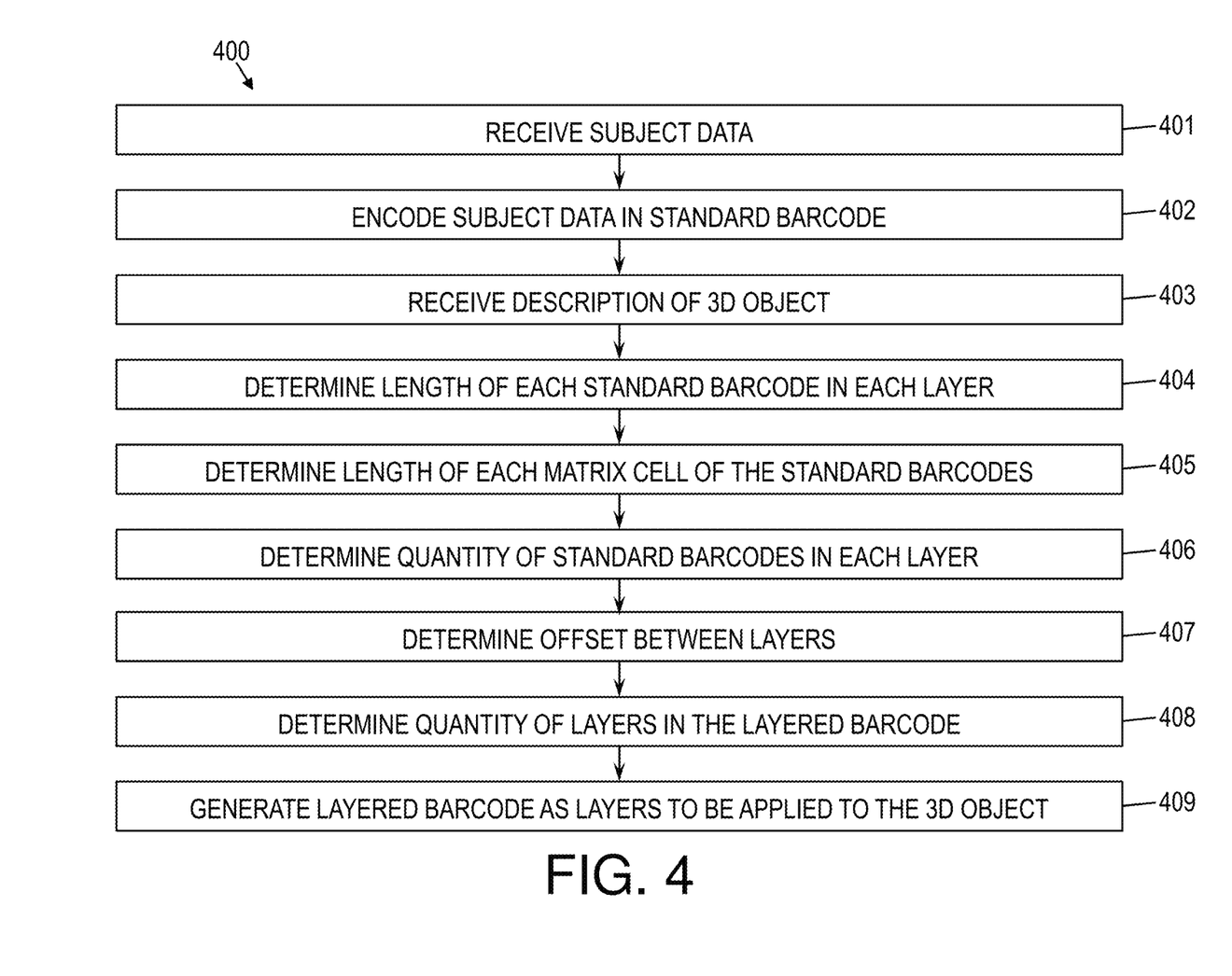
FIG. 4 is a flow diagram of a method of generating a layered barcode, according to some embodiments of the invention.

FIG. 4 is a flow diagram of a method 400 of generating a layered barcode 150, according to some embodiments of the invention. As shown in FIG. 4, at block 401, subject data is received to be encoded in a layered barcode 150. For example, and not by way of limitation, the subject data may be a web address, text, or other data. At block 402, the subject data is encoded into a standard barcode 130 by way of a barcode generator 110. For example, and not by way of limitation, the barcode generator 110 may be one known in the art or may implement a barcode-generation methodology known in the art.

However, in some embodiments of the invention, the barcode-generation system 100 may receive the generated standard barcode 130 rather than receiving the subject data, and in that case, blocks 401 and 402 of the method 400 may be skipped. In some embodiments of the invention, the remainder of this method 400 may be performed by the layering engine 120.

At block 403, a description of the 3D object 140 is received. The information in that description may vary based on the type of object 140. For instance, each supported object type (e.g., sphere, cylinder 310) may have a set of fields for which values are expected to describe the object 140. For example, and not by way of limitation, if the object 140 is a right cylinder 310, the description may include the height as well as the circumference, radius, or diameter. For another example, if the object 140 is a sphere, the description may include the radius, diameter, or circumference.

Below, various calculations are performed to determine parameters related to how to arrange copies of a standard barcode 130 within layers 155 of the layered barcode 150. In this example method 400, these parameters include the length of each copy of the standard barcode 130, the length of each cell, the quantity of copies of the standard barcode 130 within a layer 155, the offset of the layers 155, and the quantity of layers 155. One of skill in the art will understand, however, that the copies of the standard barcode within each layer 155 of the layered barcode 150 may be arranged in various ways and that the parameters determined below are exemplary and not restrictive, and further, the method of determining these parameters is also exemplary and not restrictive. For example, and not by way of limitation, the copies of the standard barcode 130 may be sized and arranged, at least in part, based on a random-number generator, as long as the copies are arranged to face various angles around the object 140. In that case, the random-number generator may be used to generate a set of parameters for arranging the copies. For another example, a user may specify the values of these parameters or others, and such values may be used as received.

At block 404, the length of each standard barcode 130 (i.e., each copy of the standard barcode 130) in the layers 155 of the layered barcode 150 is determined. In some embodiments of the invention, for instance, when the object 140 is a cylinder 310, the length of each standard barcode 130 may be the height of the cylinder 310. Further, each standard barcode 130 within each layer 155 may have the same length and height, and thus this may be the height of each standard barcode 130 and of each layer 155 as well.

In one example, a cylinder 310 used as the 3D object 140 is 30 cm tall and has a circumference of 180 cm. This description of the object 140 may be received at block 403, for instance. For a cylinder 310, the surface of the object 140 is made up of a top circle, a bottom circle, and continuous side connecting to both the top circle and the bottom circle. In this example, the layered barcode 150 is configured to wrap around the side of the cylinder 310, and thus, the layered barcode 150 may be configured to fit into the rectangle that forms that surface of the cylinder 310. In this example, the length of each standard barcode 130 is 30 cm, to match the height of the object 140. In some embodiments of the invention, as in this example, the circumference of the cylinder 310, and thus the length of the rectangle onto which the layered barcode 150 is to be printed, is an integer multiple of the length of each layer 155. However, it will be understood that this need not be the case.

Although application of a layered barcode 150 to a cylinder 310 is described herein, it will be understood by one skilled in the art that various 3D objects 140 may be used. For example, and not by way of limitation, a layered barcode 150 may be generated for and applied to a sphere. Various techniques exist for printing on a sphere or for applying a two-dimensional image onto a sphere. Such techniques can be used in conjunction with embodiments of this invention to apply a layered barcode 150 to a sphere. In that case, for instance, there may be both a horizontal and a vertical offset between layers, and these offsets may or may not be the same. In some embodiments of the invention, the one or more offsets need not be fixed. For instance, a variety of copies of the standard barcode 130 may be applied to the sphere in overlapping layers 155, without the use of a consistent offset. The various layers 155 may be distributed throughout a two-dimensional space, which may be applied to the sphere, and which may be transformed, or morphed, before application to better fit the shape of the sphere.

At block 405 of the method 400, the length of each matrix cell of the standard barcodes 130 in the layers 155 is determined. As discussed above, each layer 155 may include one or more QR code, each of which is a copy of the standard barcode 130, and each of which is a grid or matrix of cells. The dimensions of this matrix in terms of these cells (i.e., the number of cells in the length and in the width) may be determined, and the size of each cell may then be determined based on the length of each standard barcode 130 and further based the dimensions in terms of cells. In some embodiments of the invention, the cells may be square, and thus, the length and width of each cell may be the length of the standard barcode 130 divided by the number of cells in each direction of the standard barcode 130.

For instance, suppose a standard barcode 130 being represented is a QR code that is a 60×60 grid of matrix cells. Thus, because the length of each standard barcode 130 in each layer 155 is 30 cm in the example above, the size of each cell is 0.5 cm long by 0.5 cm wide, which enables the 60×60 grid of cells to fit into a 30 cm by 30 cm space.

At block 406, the quantity of standard barcodes 130 within each layer 155 may be determined. More specifically, for instance, the quantity of standard barcodes 130 may be calculated as on the length of each layer 155, which may be length of the circumference in the case of a cylinder 310, divided by the length of each standard barcode 130.

In the ongoing example, the circumference of the cylinder is 180 cm, and the length of each standard barcode 130 is 30 cm. Thus, the quantity of standard barcodes 130, positioned side-by-side within a series within a layer 155, is 6.

At block 407, an offset between layers 155 of the layered barcode 150 is determined. As discussed above, in some embodiments of the invention, the layers 155 overlap one another but have various offset positions on the surface of the object 140. Thus, an offset may be determined, and each layer 155 may be offset from a previous layer 155 according to the offset value. In some embodiments of the invention, the length of each standard barcode 130 is an integer multiple of the offset. Additionally or alternatively, in some embodiments of the invention, the circumference of the cylinder 310 is an integer multiple of the standard barcode 130, thus enabling for a series of complete standard barcodes 130 in each layer 155. Thus, for example, and not by way of limitation, the offset may be calculated as a fraction (e.g., a third or a fourth) of the length of each standard barcode 130, such that an integer multiple of the fraction of the length adds up to the complete length. The size of the fraction may be dependent, at least in part, on the overall magnitude of the object 140 or the number of layers 155 being used. For instance, for a very large object, a smaller fraction (e.g., a tenth, or a hundredth) of the length of a standard barcode 130 may be selected as the offset in conjunction with a high quantity of layers (e.g, ten), thus enabling a standard barcode 130 to be viewable from a great range of angles.

Returning to the above example with the cylinder 310, the offset may be selected to be the size of twenty matrix cells, which is a third of all the cells in one direction. Given that each cell is half a centimeter, the offset size is calculated as 10 cm.

At block 408, a quantity of the layers 155 may be determined. In some embodiments of the invention, the quantity of layers 155 is the length of each standard barcode 130 divided by the offset. As a result, in some embodiments of the invention, the number of layers 155 may allow for the existence of one layer 155 at each possible offset without a complete overlap between any two layers 155.

In the ongoing example, there may be a total of three layers 155 in the layered barcode 150, which is calculated as the length of a standard barcode 130 (i.e., 30 cm in this example) divided by the offset (i.e., 10 cm in this example). In other words, a first layer 155 has an offset of 0, a second layer 155 has an offset of 10, and a third layer 155 has an offset of 20. At the 30 cm position, a second standard barcode 130 of the first layer 155 may be positioned, due to each layer 155 being a series of copies of the standard barcode 130 according to some embodiments of the invention.

At block 409, the layered barcode 150 may be generated for application to the object 140 according to the determined parameters. To this end, a vector may be determined for each cell of the layered barcode 150, where the vector encodes whether each layer 155 is set at each cell of the layered barcode 150, given the arrangement of layers 155 as described above. Given a respective vector for each cell, a corresponding color may be associated with each cell based on the respective vector. One of skill in the art will understand, however, that embodiments of the invention need not utilize a traditional vector. Rather, for instance, a set of distinct Boolean variables may be used for each layer 155, rather than a vector of Boolean variables, and the values of these Boolean variables may be combined to produce a value used instead of a vector value. The various colors across the cells of the layered barcode 150 may together make up the layered barcode 150.

In some embodiments of the invention, to determine a color associated with each vector value, the barcode-generation system 100 has a set of one or more predefined mappings, which may include, for instance, a corresponding mapping for each vector size (i.e., each supported number of layers) or a single mapping for all vector sizes. Such a mapping may be a one-to-one mapping of each possible value of the applicable vector size, or vector sizes, to a corresponding color. Thus, in some embodiments of the invention, given the number of layers 155 determined, the barcode-generation system 100 may select an established mapping and may therefore determine a color for each possible value of each cell of the layered barcode 150. Having predefined mappings may be useful because scanners 160 may be aware of such predefined mappings may thus use these mappings to interpret the colors of layered barcodes 150. However, it will be understood by one skilled in the art that other implementations are within the scope of embodiments of the invention.

For example, and not by way of limitation, generation of the layered barcode 150 may include generating an image of the colored cells representing the arrangement of standard barcodes 130 in layers 155 according to the determined parameters. For another example, generation of the layered barcode 150 may include printing the resulting colored cells directly onto the object 140, or the colored cells may be printed onto one or more sheets of some other material (e.g., vinyl with adhesive backing) and applied to the object 140 after printing. Various mechanisms exist for printing on 3D objects 140 or for printing to other material for application to 3D objects 140, and one or more of such mechanisms may be used according to some embodiments of the invention.

Figure 5:
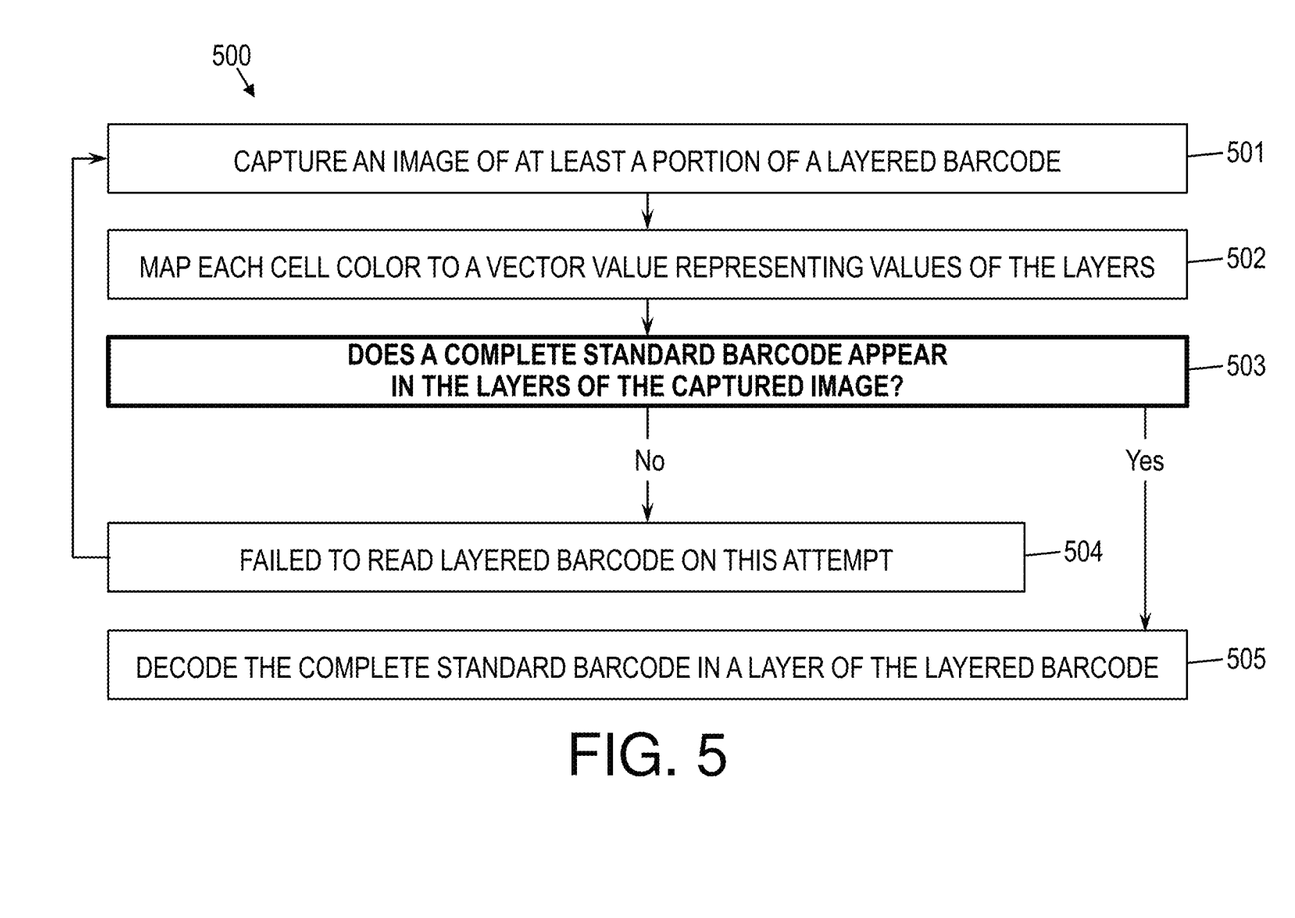
FIG. 5 is a flow diagram of a method of reading a layered barcode, according to some embodiments of the invention.

FIG. 5 is a flow diagram of a method 500 of reading a layered barcode 150, according to some embodiments of the invention. This method 500 may be performed by a barcode scanner 160, or in communication with a barcode scanner 160, configured to read a layered barcode 150. For instance, a barcode scanner 160 may be updated with program code to perform this method 500 or a similar method to recognize the layers 155 of layered barcodes 150. This program code may include, for example, and not by way of limitation, the predefined mappings of vector values to colors.

As shown in FIG. 5, at block 501, such a scanner 160 captures an image 320 of at least a portion of a layered barcode 150. According to some embodiments of the invention, it is not necessary that the scanner 160 capture the entire layered barcode 150.

At block 502, the scanner 160 may map each cell of the captured image 320 to a vector value. More specifically, each cell may be colored, and the color of each cell may be mapped to a vector value, such as by using a predefined mapping corresponding to the number of layers 155. In some embodiments of the invention, if multiple mappings are available, the appropriate mapping may be selected based on the colors appearing in the captured image 320. Given the vector value of each cell in the captured image 320, the scanner 160 may thus determine which cells are set within the standard barcodes 130, or portions thereof, in each layer 155. In other words, the scanner 160 may identify the standard barcodes 130 themselves, or portions thereof, within the various layers 155.

At decision block 503, it may be determined whether a complete standard barcode 130 appears in the captured image 320. For instance, based on the detection of position markers within the layers 155, the scanner 160 can determine whether any layer 155 includes a complete standard barcode 130.

If no layer 155 in the captured image 320 is deemed complete, then the scanner 160 may determine that the read failed at block 504. Then, the scanner 160 may attempt to read the layered barcode 150 by once again capturing another image 320 at block 501.

However, if a layer is deemed complete in a particular color, then at block 505, the scanner 160 may decode, or interpret, a standard barcode 130 identified as complete, as per traditional barcode reading. As a result, the subject data encoded in the standard barcode 130 and the layered barcode 150 may be determined.

Figure 6:
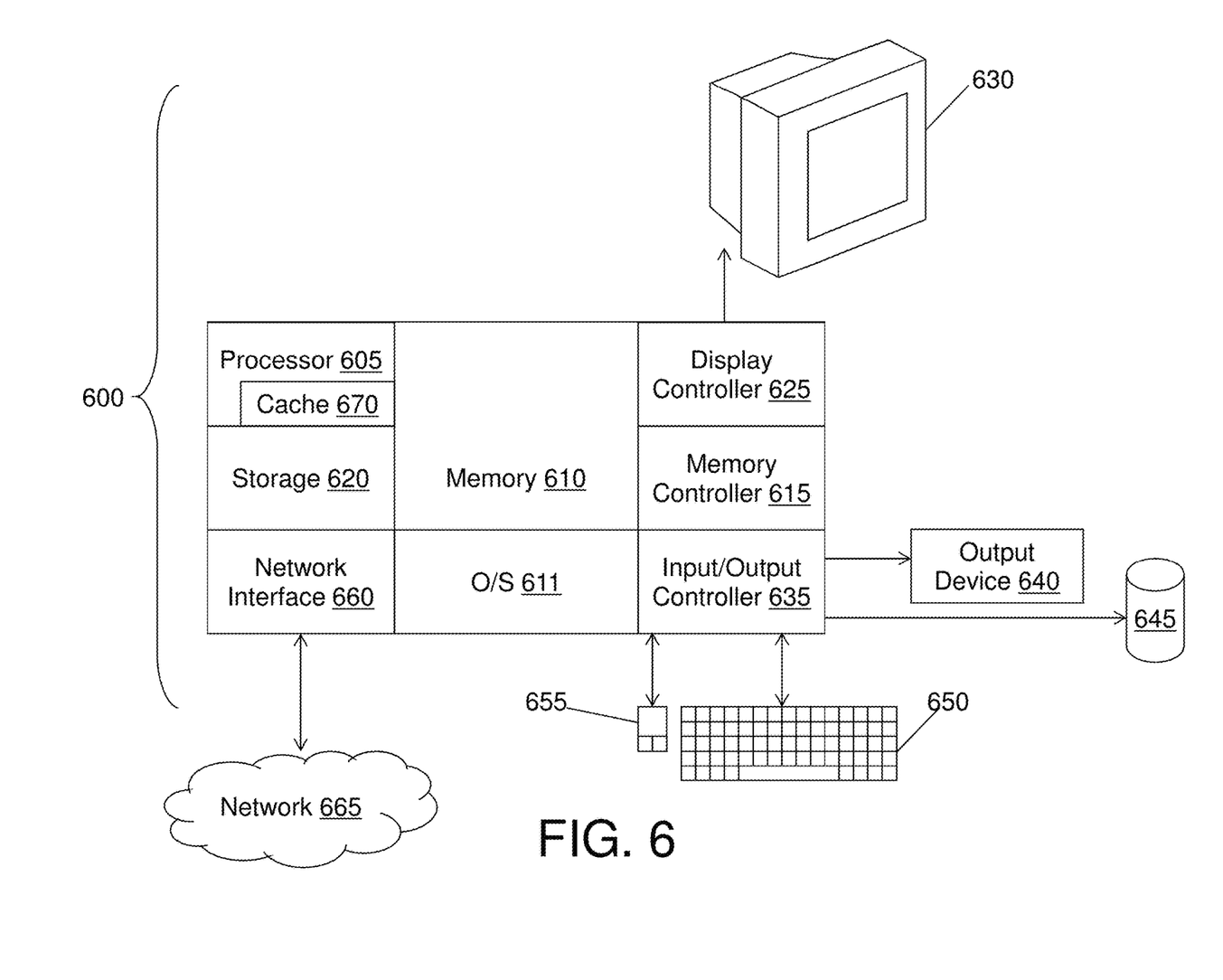
FIG. 6 is a block diagram of a computer system for implementing some or all aspects of the barcode-generation system, according to some embodiments of this invention.

FIG. 6 is a block diagram of a computer system 600 for implementing some or all aspects of the barcode-generation system 100, according to some embodiments of this invention. The barcode-generation systems 100 and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer. For example, and not by way of limitation, the barcode generator 110, the layering engine 120, and the barcode scanner 160 may be implemented as one or more computer systems 600 or portions thereof, or may run on one or more computer systems 600.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor-based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid-state drive. The stored instructions in memory 610 or in storage 620 may include those enabling the processor to execute one or more aspects of the barcode-generation systems 100 and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Barcode-generation systems 100 and methods according to this disclosure may be embodied, in whole or in part, in computer program products or in computer systems 600, such as that illustrated in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining a set of parameters defining an arrangement of a plurality of copies of a standard barcode in two or more of layers of a layered barcode encoding subject data, wherein the layered barcode comprises a plurality of cells;
   for each cell in the layered barcode:
      determining a combined value for the cell, wherein the combined value of the cell indicates a respective value of each layer at the cell; and
      mapping the combined value to a color corresponding to the combined value; and
   generating the plurality of layers of the layered barcode, wherein, at each cell of the plurality of cells, the layered barcode comprises the color corresponding to the combined value of the cell,
   wherein each layer of the plurality of layers has a corresponding offset position within the layered barcode, and wherein a first offset position of the first layer is distinct from a second offset position of the second layer.

2. The computer-implemented method of claim 1, wherein the determining the set of parameters defining the arrangement of the plurality of layers comprises:
receiving a description of a three-dimensional (3D) object;
wherein the set of parameters are based on the 3D object.

3. The computer-implemented method of claim 2, further comprising applying the layered barcode to a surface of the 3D object.

4. The computer-implemented method of claim 3, wherein the 3D object is a cylinder.

5. The computer-implemented method of claim 1, wherein the determining the set of parameters defining the arrangement of the plurality of layers comprises determining an offset between layers of the plurality of layers.

6. The computer-implemented method of claim 1, wherein each copy of the standard barcode of the layered barcode is individually decodable to produce the subject data.

7. A system comprising:
a memory having computer-readable instructions; and
one or more processors for executing the computer-readable instructions, the computer-readable instructions for:
determining a set of parameters defining an arrangement of a plurality of copies of a standard barcode in two or more of layers of a layered barcode encoding subject data, wherein the layered barcode comprises a plurality of cells;
for each cell in the layered barcode:
determining a combined value for the cell, wherein the combined value of the cell indicates a respective value of each layer at the cell; and
mapping the combined value to a color corresponding to the combined value; and
generating the plurality of layers of the layered barcode, wherein, at each cell of the plurality of cells, the layered barcode comprises the color corresponding to the combined value of the cell,
wherein each layer of the plurality of layers has a corresponding offset position within the layered barcode, and wherein a first offset position of the first layer is distinct from a second offset position of the second layer.

8. The system of claim 7, wherein the determining the set of parameters defining the arrangement of the plurality of layers comprises:
receiving a description of a three-dimensional (3D) object;
wherein the set of parameters are based on the 3D object.

9. The system of claim 8, wherein the computer-readable instructions are further for applying the layered barcode to a surface of the 3D object.

10. The system of claim 9, wherein the 3D object is a cylinder.

11. The system of claim 7, wherein the determining the set of parameters defining the arrangement of the plurality of layers comprises determining an offset between layers of the plurality of layers.

12. A computer-program product for generating a layered barcode, the computer-program product comprising a computer-readable storage medium having program instructions embodied therewith, the program instructions executable by a processor to cause the processor to perform a method comprising:
determining a set of parameters defining an arrangement of a plurality of copies of a standard barcode in two or more of layers of a layered barcode encoding subject data, wherein the layered barcode comprises a plurality of cells;
for each cell in the layered barcode:
determining a combined value for the cell, wherein the combined value of the cell indicates a respective value of each layer at the cell; and
mapping the combined value to a color corresponding to the combined value; and
generating the plurality of layers of the layered barcode, wherein, at each cell of the plurality of cells, the layered barcode comprises the color corresponding to the combined value of the cell,
wherein each layer of the plurality of layers has a corresponding offset position within the layered barcode, and wherein a first offset position of the first layer is distinct from a second offset position of the second layer.

13. The computer-program product of claim 12, wherein the determining the set of parameters defining the arrangement of the plurality of layers comprises:
receiving a description of a three-dimensional (3D) object;
wherein the set of parameters are based on the 3D object.

14. The computer-program product of claim 13, the method further comprising applying the layered barcode to a surface of the 3D object.

15. The computer-program product of claim 14, wherein the 3D object is a cylinder.

16. The computer-program product of claim 12, wherein the determining the set of parameters defining the arrangement of the plurality of layers comprises determining an offset between layers of the plurality of layers.

17. The computer-program product of claim 12, wherein each copy of the standard barcode of the layered barcode is individually decodable to produce the subject data.

* * * * *